United States Patent
Gundlach et al.

(10) Patent No.: US 7,423,436 B2
(45) Date of Patent: Sep. 9, 2008

(54) CAPACITIVE LEVEL MEASUREMENT AND DETECTION DEVICE USING HIGH FREQUENCY VOLTAGE

(75) Inventors: Jochen Gundlach, Wasserburg (DE); Werner Hoch, Tettnang (DE); Francesco Bernd, Tettnang (DE)

(73) Assignee: i f m electronic GmbH, Essen (DE)

( * ) Notice: Subject to any disclaimer, the term of this patent is extended or adjusted under 35 U.S.C. 154(b) by 0 days.

(21) Appl. No.: 11/423,853

(22) Filed: Jun. 13, 2006

(65) Prior Publication Data

US 2006/0285212 A1 Dec. 21, 2006

(30) Foreign Application Priority Data

Jun. 13, 2005 (DE) .................. 10 2005 027 344

(51) Int. Cl.
*G01R 27/26* (2006.01)
(52) U.S. Cl. ................ 324/662; 324/676; 73/304 C; 73/304 R
(58) Field of Classification Search ................ 324/665, 324/693, 662, 671, 658, 663, 661, 676; 73/304 R, 73/304 C
See application file for complete search history.

(56) References Cited

U.S. PATENT DOCUMENTS

| | | | | |
|---|---|---|---|---|
| 3,723,845 | A * | 3/1973 | Duckworth | 324/106 |
| 4,588,858 | A * | 5/1986 | Watts et al. | 379/405 |
| 4,860,755 | A * | 8/1989 | Erath | 600/405 |
| 5,818,241 | A * | 10/1998 | Kelly | 324/640 |
| 6,194,903 | B1 | 2/2001 | Schulz | |
| 6,225,710 | B1 | 5/2001 | Palata et al. | |
| 6,295,874 | B1 * | 10/2001 | Strutt et al. | 73/597 |
| 6,782,747 | B2 | 8/2004 | Gundlach et al. | |
| 6,823,730 | B2 | 11/2004 | Buck et al. | |
| 2001/0037680 | A1 * | 11/2001 | Buck et al. | 73/304 C |
| 2004/0229582 | A1 * | 11/2004 | Miyasita et al. | 455/136 |
| 2004/0263187 | A1 * | 12/2004 | Hayashi et al. | 324/698 |

FOREIGN PATENT DOCUMENTS

| | | |
|---|---|---|
| DE | 38 12 687 A1 | 10/1989 |
| DE | 195 02 195 A1 | 8/1996 |
| DE | 101 53 298 A1 | 5/2003 |
| DE | 101 55 131 A1 | 5/2003 |
| DE | 102 50 523 A1 | 7/2003 |

* cited by examiner

*Primary Examiner*—Georgia Y. Epps
*Assistant Examiner*—Francis M Legasse, Jr.
(74) *Attorney, Agent, or Firm*—David S. Safran

(57) ABSTRACT

A device for measurement and detection of the level of a medium in a container with a sensor element, with a reference element and an electrical circuit which contains at least one AC voltage source and an evaluation unit, the sensor element and the reference element being arranged such that the medium to be measured or detected influences the impedance between them. The capacitive level measurement and detection device has an AC voltage source that supplies a high-frequency voltage or a voltage with high frequency voltage portions. The circuit which has the AC voltage source, the sensor element and the reference element has an impedance which is as low as possible. The electrical circuit can have an amplifier, a timer, a pulse shaper, a first synchronous rectifier, a first I/U converter, a microcontroller, a reference impedance, a second synchronous rectifier and a second I/U converter.

12 Claims, 2 Drawing Sheets

CAPACITIVE LEVEL MEASUREMENT AND DETECTION DEVICE USING HIGH FREQUENCY VOLTAGE

BACKGROUND OF THE INVENTION

1. Filed of the Invention

The invention relates to a capacitive level measurement and detection device for measurement and detection of the level of a medium in a container or the like, with a sensor element, with a reference element, and with an electrical circuit which contains at least one AC voltage source and an evaluation unit and which is connected, on the one hand, to the sensor element, and on the other, to the reference element, the sensor element and the reference element being made and arranged such that the medium with the level to be measured or detected can influence the impedance between the sensor element and the reference element, and thus, the electrical alternating current between the sensor element and the reference element (and in the electrical circuit).

2. Description of Related Art

Initially, the designation level measurement device or level detection device was chosen because it can, depending on the level of a medium in a container or the like being measured, generate an analog measurement signal, and also can detect only a certain, given level of a medium in a container or the like, therefore, generating a digital measurement signal when the given level has not reached/has been reached.

Generally, a capacitive level measurement and detection device for measurement or detection of the level of a medium in a container is used in a narrower sense, for example, in a tank. Initially, it is noted that the expression "for measurement and detection of the level of a medium in a container or the like," is intended to express that it can be a matter not only of the level of a medium in a container in a narrow sense, but that it can also be a matter of measuring and detecting the level of a medium, for example, in a trough.

For the capacitive level measurement and detection device under consideration, first of all, it is not important how the sensor element, on the one hand, and the reference element, on the other, are made; what is important is simply that the sensor element and the reference element are made and arranged such that the medium with a level to be measured or detected can influence the impedance between the sensor element and the reference element. The sensor element and reference element must, therefore, be made and arranged such that there is an intermediate space between the sensor element and reference element, and the medium with a level which is to be measured and detected can more or less travel into this intermediate space. Generally, at least the sensor element is one which has a lengthwise extension in the vertical direction so that the medium with a level which is to be measured or detected more or less touches or surrounds the sensor element at least partially depending on the instantaneous level.

The sensor element and the reference element can be components separate from the container. It is also possible to use a container wall as the reference element. It is also possible to implement the sensor element and also the reference element by the container wall or by parts of the container wall; of course, then, the sensor element and also the reference element must be galvanically separated from one another.

Capacitive level measurement and detection devices of the type under consideration and the measurement and evaluation processes used in this connection are common in the prior art. In this respect, reference is made to German patent disclosure documents 38 12 687; 195 02 195; 198 13 013 (corresponding to U.S. Pat. No. 6,225,710); 100 08 093 (corresponding to U.S. Pat. No. 6,823,730); 101 53 298; 101 55 131; 102 05 445 (corresponding to U.S. Pat. No. 6,782,747); and 102 50 523. In particular, German patent disclosure documents 38 12 687; 195 02 195; 100 08 093 (corresponding to U.S. Pat. No. 6,823,730); and 101 55 131 also disclose sensor elements as can be used in the capacitive level measurement and detection devices under consideration.

One problem is common to the known capacitive level measurement and detection devices of the type under consideration; it is explained below.

When using the known capacitive level measurement and detection devices, adherence of the medium, the level of which in the container or the like is to be measured or detected, to the sensor element and/or the reference element cannot be prevented. Here, adherence means residues of the medium which have remained on the sensor element and/or the reference element, if after the level has once been reached, the medium has returned. In any case, when these adherences are low-resistance, it can no longer be adequately distinguished between these adherences and the voluminous medium with a level which is to be to be measured or detected. This is due to the unfavorable ratio of the relatively high impedance of the sensor element and/or of the reference element and the relatively low impedance of the adherences and of the voluminous medium. The relatively low impedance of the adherences and of the voluminous medium results from the fact that at the frequencies of the AC voltage provided by the AC voltage source used, for example, a frequency of 2 MHz, the impedance is ohmic-capacitive. The ohmic portion of these impedances also results largely from the ion conductivity of the adherences and of the voluminous medium.

SUMMARY OF THE INVENTION

A primary object of the present invention is, consequently, to provide a capacitive level measurement and detection device which delivers relatively accurate results even with adherences to the sensor element and/or the reference element.

According to a first teaching of the invention, the aforementioned object is achieved in the initially described capacitive level measurement and detection device in that the AC voltage supplied by the AC voltage source is high-frequency or contains high frequency voltage portions. In particular, the frequency of the AC voltage supplied by the AC voltage source can be between 20 MHz and 200 MHz, preferably between 80 MHz and 150 MHz, especially roughly 100 MHz.

It was already mentioned above that adherences of the medium with a level to be measured or detected to the sensor element and/or the reference element, in any case, when these adherences have a low-resistance, it can no longer be distinguished with adequate precision between these adherences and the voluminous medium with a level to be measured or detected, that the reason for this lies in the unfavorable ratio of the relatively high impedance of the sensor element and/or of the reference element and the relatively low impedance of the adherences and of the voluminous medium and that at the frequencies of the AC voltage made available by the AC voltage source used, the impedance is ohmic-capacitive, the ohmic portion of these impedances also resulting largely from the ion conductivity of the adherences and of the voluminous medium. This finding, especially the finding that the ohmic portion of the impedances under consideration results largely from the ion conductivity of the adherences and of the voluminous medium is already part of the teaching of the invention. Based on this finding, then, the object is achieved in accordance with the invention by working with a relatively high frequency AC voltage or with an AC voltage which contains high frequency voltage portions, because this reduces the ion conductivity of the adherences and of the voluminous medium.

According to a second teaching of the invention, which can also be implemented separately from the first teaching of the invention, the aforementioned object is achieved in the initially described capacitive level measurement and detection device in that the circuit which has the AC voltage source, the sensor element and the reference element is made with an impedance which is as low as possible. This teaching is based on the following consideration.

As has been explained above, in the capacitive level measurement and detection devices known in the prior art, the reason why adherences cannot be distinguished from the voluminous medium with adequate precision lies in the unfavorable ratio of the relatively high impedance of the sensor element and/or of the reference element and the relatively low impedance of the adherences and of the voluminous medium. According to the second teaching of the invention, because the circuit which has the AC voltage source, the sensor element and the reference element is made with an impedance which is as low as possible, a much better ratio between the impedance of the circuit under consideration and the impedance of the adherences and of the voluminous medium is achieved, so that the change of the impedance of the voluminous medium measurably influences the altogether effective impedance.

To implement the second teaching of the invention, i.e., to make the circuit which has the AC voltage source, the sensor element and the reference element with an impedance which is as low as possible, first of all, it is recommended that an AC voltage source with an internal resistance as low as possible be used. In terms of result, an embodiment is contemplated in which the electrical circuit, in addition to the AC voltage source and the evaluation unit, has an amplifier connected downstream of the AC voltage source, the amplifier on the output side having a lower impedance than the impedance of the AC voltage source. The measure of providing an amplifier connected downstream of the AC voltage source can also make sense when the AC voltage source, for itself, has an internal resistance as low as possible, so that the amplifier is not needed for impedance conversion. Specifically, an embodiment can be implemented in which the gain of the amplifier is controlled depending on the impedance of the medium the level of which is to be measured or detected so that the amplitude of the effective AC voltage can be controlled or also adjusted.

According to the second teaching of the invention, the circuit which has the AC voltage source, the sensor element and the reference element will be made with an impedance which is as low as possible. In this respect, it depends not only on the impedance or the internal resistance of the AC voltage source. Rather preferably, provision should be made for there being a low impedance between the AC voltage source and the medium with a level which is to be measured or detected, on the one hand, and this medium and the evaluation unit, on the other. In other words, the capacitive coupling should be especially good, and the capacitive resistance therefore should be as low as possible. Expressed differently, between the sensor element and/or the reference element, on the one hand, and the medium with a level to be measured or detected, on the other, a capacitance as large as possible is to be implemented. This can be achieved by the sensor element and/or the reference element being made with a relatively large area and/or by the insulation which surrounds the sensor element and/or the reference element having a relatively large dielectric constant and/or a relatively low wall thickness.

The first teaching of the invention, to choose an AC voltage source which supplies a high frequency AC voltage or an AC voltage which contains high frequency voltage portions, is associated with a special problem which the invention also addresses.

An especially high frequency measurement signal or a broadband measurement signal cannot be processed in real time with reasonable effort. Therefore, another teaching of the invention which acquires independent importance is that the high frequency or broadband measurement signal is converted into a relatively low frequency measurement signal, preferably by subjecting the high frequency or broadband measurement signal to time dilation; see, Principles of Radar Engineering for Level Measurement by Dr. Eng. Detlef Brumbi, 4th revised and expanded edition, May 2003, section 8.6, page 57, for the meaning of time dilation in this sense.

In particular, there are various possibilities for embodying and developing the capacitive level measurement and detection device of the invention, especially with respect to the specific circuitry. Reference is made in addition to the following detailed description in conjunction with the accompanying drawings.

DETAILED DESCRIPTION OF THE INVENTION

Figure 3:
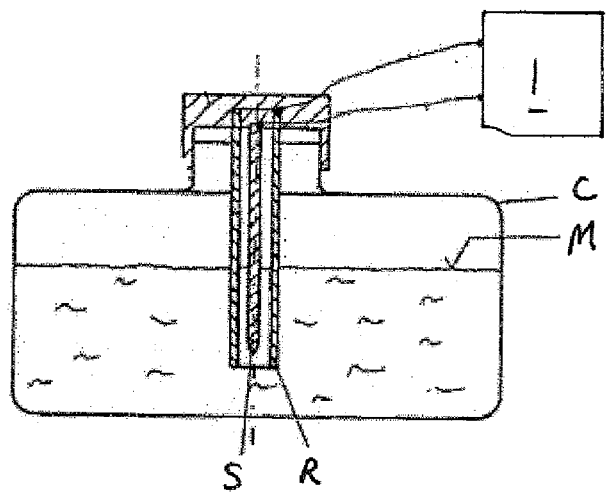
FIG. 3 is a schematic representation of a container with a capacitive level measurement and detection device.
Figure 4:
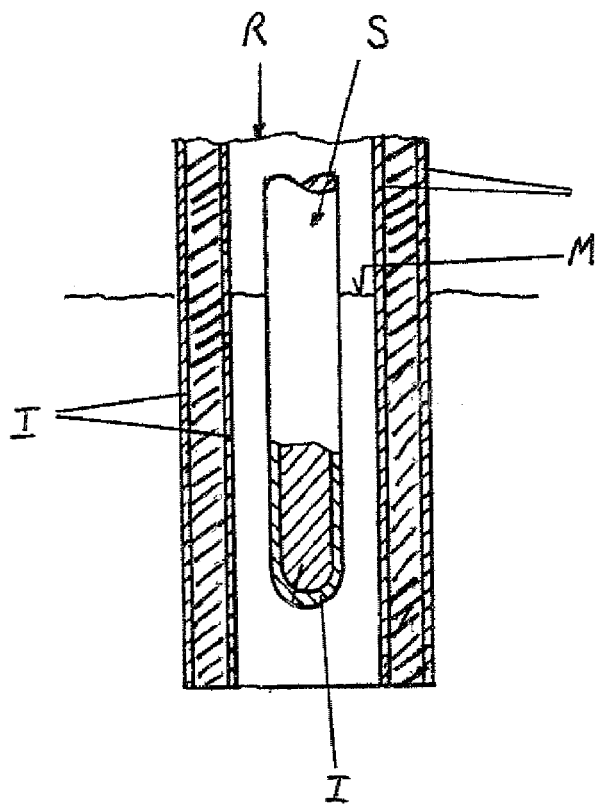
FIG. 4 is a cross-sectional view of a portion of the electrode and reference element of the device shown in FIG. 3.

The capacitive level measurement and detection device of the invention, hereinafter called only a capacitive level measurement device, includes, as necessary for operation, a sensor element S, a reference element R, and an electrical circuit 1 which is connected, on the one hand, to the sensor element, and on the other, to the reference element, and which includes at least one AC voltage source 2 and an evaluation unit 3. For the capacitive level measurement device in accordance with the invention, it does not matter how the sensor element and the reference element are made. What is important is simply that the sensor element and the reference element are made and arranged such that the medium M, the level of which is to be measured and detected, can influence the impedance between the sensor element and the reference element. The sensor element and reference element are made and arranged such that there is an intermediate space between the sensor element and reference element and the medium, the level of which is to be measured and detected, can more or less travel into this intermediate space. Generally, at least the sensor element is one which has a lengthwise extension in the vertical direction so that the medium to be measured or detected more or less at least partially touches or surrounds the sensor element depending on the instantaneous level, as can be seen from the example illustrated in FIG. 3 where the sensor element S and the reference element R are shown mounted to extend downward into a liquid medium in the container C.

The capacitive level measurement device of the invention, according to a first teaching of the invention, is characterized in that the AC voltage supplied by the AC voltage source 2 is high frequency or contains high frequency voltage portions. The frequency of the AC voltage supplied by the AC voltage source 2 can be between 20 MHz and 200 MHz, preferably between 80 MHz and 150 MHz, especially roughly 100 MHz.

According to a second teaching of the invention, which can also be implemented separately from the first teaching of the invention, the capacitive level measurement and detection device in accordance with the invention is characterized in that the circuit which has the AC voltage source 2, the sensor element and the reference element is made with an impedance which is as low as possible.

Figure 1:
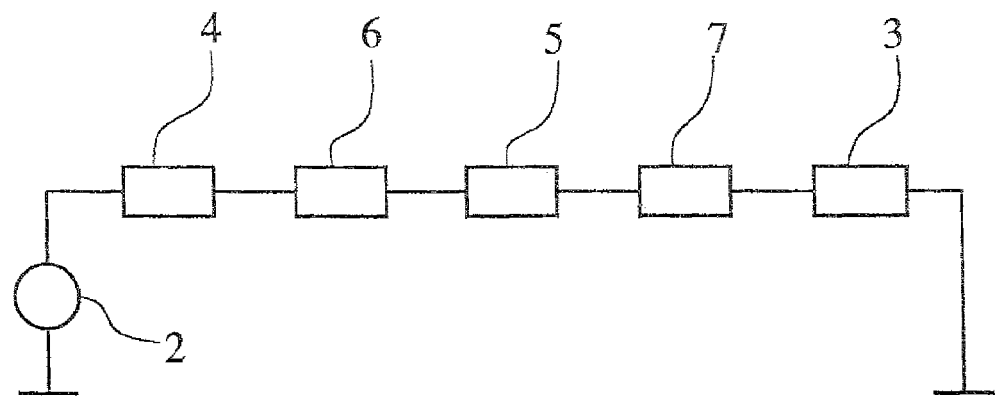
FIG. 1 is a very schematic sketch for explaining the teaching of the invention

In FIG. 1, in addition to the AC voltage source 2 and the evaluation unit 3, the internal resistance 4 of the AC voltage source 2, the measuring distance 5, specifically the medium M with a level to be measured or detected, the coupling 6 between the AC voltage source 2 with its internal resistance 4 and the measuring distance 5, and the coupling 7 between the measuring distance 5 and the evaluation unit 3 are indicated.

Figure 2:
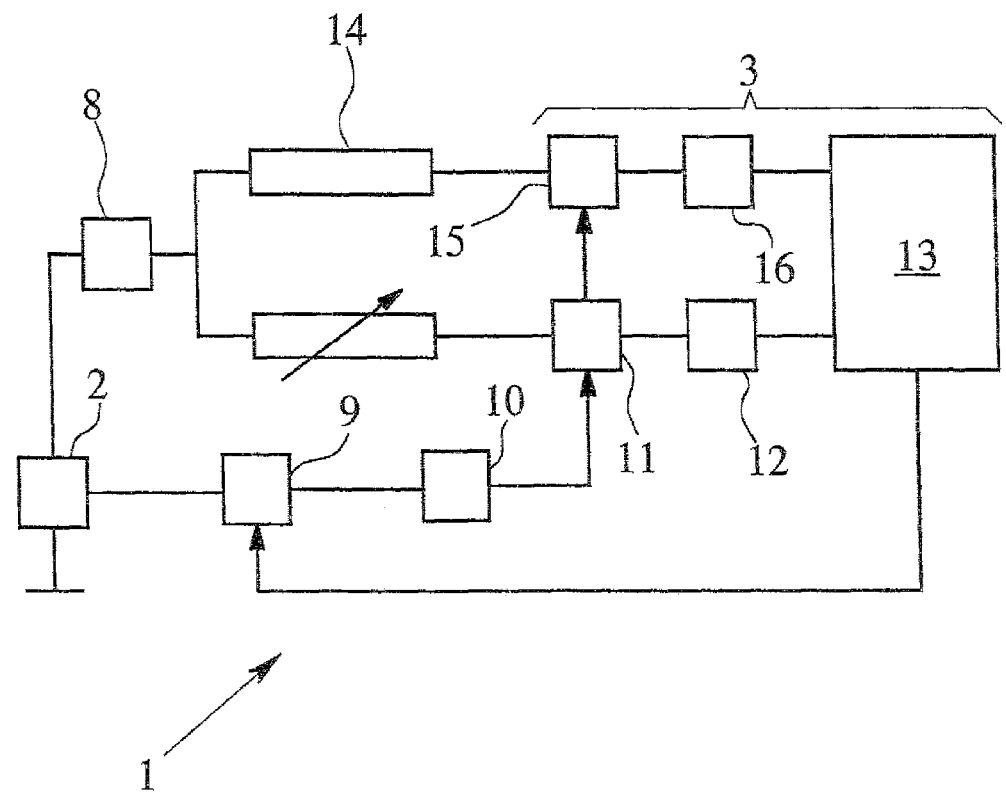
FIG. 2 is a block diagram of one exemplary embodiment of the capacitive level measurement and detection device in accordance with the invention.

First of all, the exemplary embodiment shown as a block diagram in FIG. 2 for a capacitive level measurement device of the invention has electrical circuit 1 which, in addition to the AC voltage source 2 and the evaluation unit 3, has an amplifier 8 connected downstream of the AC voltage source 2. The amplifier 8 has a lower impedance on the output side than the impedance of the AC voltage source 2; the output-side internal resistance of the amplifier 8 is therefore less than the internal resistance 4 of the AC voltage source 2. Otherwise, the amplifier 8 can be made such that its gain can be controlled or adjusted depending on the impedance of the medium M the level of which is to be measured or detected, therefore, depending on the impedance of the measuring distance 5.

What was stated above with respect to the electrical circuit 1, shown as a block diagram in FIG. 2, is used with the implementation of the second teaching of the invention, according to which that the circuit which has the AC voltage source 2, the sensor element and the reference element is made with an impedance which is as low as possible. In this respect, it is a matter not only of the internal resistance 4 of the AC voltage source 2 and the output-side internal resistance of the amplifier 8. Rather, provision can also be made for a low impedance being active between the AC voltage source 2 and the medium, the level of which is to be measured or detected, therefore, the measuring distance 5, on the one hand and the measuring distance 5 and the evaluation unit 3, on the other. In other words, the capacitive coupling 6 between the AC voltage source 2 and the measuring distance 5 and the capacitive coupling 7 between the measuring distance 5 and the evaluation unit 3 is especially good, so that the respective capacitive resistance is as low as possible. This can be achieved by the sensor element and/or the reference element being made with a relatively large area and/or that the insulation I which surrounds the sensor element and/or the reference element has a relatively large dielectric constant and/or a relatively low wall thickness.

It was stated above that the first teaching of the invention, i.e., choosing an AC voltage source 2 which supplies a high frequency AC voltage or an AC voltage which contains high frequency voltage portions, is associated with a problem which acquires special importance according to another teaching of the invention; this problem is solved in that the high frequency or broadband measurement signal is converted into a relatively low frequency measurement signal, preferably in that the high frequency or broadband measurement signal is subjected to time dilation. In the exemplary embodiment of the capacitive level measurement device of the invention shown in FIG. 2 as a block diagram, specific measures for implementation of this special teaching of the invention are implemented.

First of all, the electrical circuit 1 has a timer 9 which is connected to the AC voltage source 2 and which shifts the phase of the AC voltage over one period. A pulse shaper 10, preferably a monoflop, is connected downstream of the timer 9; the pulse shaper 10 shapes a uniform pulse with the same pulse width from the phase-shifted AC voltage. Here, it is important that the pulse width during a scanning period is constant. Furthermore, the electrical circuit 1 has a synchronous rectifier 11 to which on the input side, on the one hand, the high frequency or broadband measurement signal, and on the other, the pulses generated by the pulse shaper 10 are supplied. The output current of the synchronous rectifier 11 corresponds to the convolution of the measurement current with the rectifier signal, i.e., to the pulses generated by the pulse shaper 10. Finally, the electrical circuit 1 has an I/V converter 12 connected downstream of the synchronous rectifier 11 and a microcontroller 13 connected downstream of the I/V converter 12. The output signal of the synchronous rectifier 11 is therefore conditioned with the I/U converter 12 so that the microcontroller 13 can operate.

Finally, FIG. 2 shows, in this respect, a preferred exemplary embodiment of a capacitive level measurement device in accordance with the invention which has a reference branch connected parallel to the measurement branch having the sensor element, the reference element, the synchronous rectifier 11 and the I/V converter 12, the reference branch having a reference impedance 14, a second synchronous rectifier 15 and a second I/U converter 16. The synchronous rectifier 15 and the I/V converter 16 of the reference branch are made the same as the synchronous rectifier 15 and the I/V converter 12 of the measurement branch, and on the one hand, the reference signal, and on the other, the pulses generated by the pulse shaper 11 are supplied to the input side of the synchronous rectifier 15 of the reference branch. Therefore, the electrical circuit 1 implemented in the exemplary embodiment as shown in FIG. 2 is symmetrical. Using the reference branch, the adverse consequences of inevitable tolerances can be eliminated, specifically, the pulse width of the pulses generated by the pulse shaper 10 (large drift), drift in the synchronous rectifier 11 and drift in the I/V converter 12.

Finally, it is pointed out that the microcontroller 13 detects and compares the time-dilated measurement and reference signal, and evaluates the time-dilated measurement and reference signal in the frequency and/or time domain. Using stored comparison tables, setpoint-actual value comparators or compensation data, then the microcontroller 13 decides about the output signal which is to be output.

What is claimed is:

1. Capacitive level measurement and detection device for measurement or detection of the level of a medium in a container, comprising:

a sensor element, a reference element, the reference element being arranged relative to the sensor element in a manner enabling the medium, the level of which is to be measured or detected, to influence the impedance between the sensor element and the reference element, and an electrical circuit having at least one AC voltage source and an evaluation unit, the evaluation unit being connected to the sensor element and to the reference element, wherein the AC voltage source supplies a high-frequency voltage or a voltage which contains high frequency voltage portions;

wherein the electrical circuit further comprises a timer which is connected to the AC voltage source and is adapted to shift the phase of the AC voltage over one period;

wherein a pulse shaper is connected downstream of the timer for producing a uniform pulse with the pulse width from the phase-shifted AC voltage;

wherein the electrical circuit further comprises a synchronous rectifier, on the input side of which the high frequency or broadband measurement signal and pulses generated by the pulse shaper are supplied;

wherein the electrical circuit further comprises a current to voltage I/V converter connected downstream of the synchronous rectifier;

wherein the electrical circuit further comprises has a microcontroller connected downstream of the I/V converter;

wherein the sensor element, the reference element, the synchronous rectifier and the I/V converter form a measurement branch of the electrical circuit, and where a reference branch is connected in parallel with the measurement branch, the reference branch comprising a reference impedance, a second synchronous rectifier and a second I/V converter, wherein the second synchronous rectifier and the second I/V converter are the same as the synchronous rectifier and the I/V converter of the measurement branch; wherein a reference signal and pulses generated by the pulse shaper are supplied to the input side of synchronous rectifier of the reference branch; and wherein said evaluation unit is comprised of the second synchronous rectifier, the second I/V converter, and said microcontroller.

2. Capacitive level measurement and detection device as claimed in claim 1, wherein the pulse shaper comprises a monoflop.

3. Capacitive level measurement and detection device as claimed in claim 1 wherein the frequency of the AC voltage supplied by the AC voltage source is between 80 MHz and 150 MHz.

4. Capacitive level measurement and detection device as claimed in claim 1 wherein the frequency of the AC voltage supplied by the AC voltage source is approximately 100 MHz.

5. Capacitive level measurement and detection device as claimed in claim 1 wherein the electrical circuit further comprises an amplifier connected downstream of the AC voltage source.

6. Capacitive level measurement and detection device as claimed in claim 5, wherein the amplifier has a lower impedance on an output side thereof than an impedance of the AC voltage source for producing said minimal impedance.

7. Capacitive level measurement and detection device as claimed in claim 5, wherein the gain of the amplifier is controlled or adjusted depending on the impedance of the medium, the level which is to be measured or detected for producing said minimal impedance.

8. Capacitive level measurement and detection device as claimed in claim 1, wherein a maximal capacitance is located between at least one the sensor element and the reference element, on the one hand, and the medium the level of which is to be measured or detected, on the other.

9. Capacitive level measurement and detection device as claimed in claim 8, wherein at least one of the sensor element and the reference element has a area that is large enough to produce said maximal capacitance.

10. Capacitive level measurement and detection device as claimed in claim 8, wherein an insulation is provided surrounding at least one of the sensor element and the reference element that has at least one of a dielectric constant that is large enough and a wall thickness that is low enough to produce said maximal capacitance.

11. Capacitive level measurement and detection device as claimed in claim 1, further comprising means for converting a high frequency or broadband measurement signal into a relatively low frequency measurement signal.

12. Capacitive level measurement and detection device as claimed in claim 11, wherein the means for converting is operable for subjecting the high frequency or broadband measurement signal to time dilation.

* * * * *